(12) United States Patent
Stephan et al.

(10) Patent No.: US 10,928,291 B2
(45) Date of Patent: Feb. 23, 2021

(54) METHOD AND DEVICE FOR CLASSIFYING SUPERABSORBENT PARTICLES

(71) Applicant: BASF SE, Ludwigshafen am Rhein (DE)

(72) Inventors: Oskar Stephan, Hockenheim (DE); Norbert Eugen Voll, Worms (DE); Rüdiger Funk, Niedernhausen (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 15/740,018

(22) PCT Filed: Jun. 29, 2016

(86) PCT No.: PCT/EP2016/065176
§ 371 (c)(1),
(2) Date: Dec. 27, 2017

(87) PCT Pub. No.: WO2017/001500
PCT Pub. Date: Jan. 5, 2017

(65) Prior Publication Data
US 2018/0188149 A1    Jul. 5, 2018

(30) Foreign Application Priority Data
Jul. 1, 2015 (EP) .................................. 15174750

(51) Int. Cl.
*G01N 15/02*    (2006.01)
*B07B 1/54*     (2006.01)
(Continued)

(52) U.S. Cl.
CPC ......... *G01N 15/0272* (2013.01); *B07B 1/469* (2013.01); *B07B 1/54* (2013.01);
(Continued)

(58) Field of Classification Search
CPC ....... B07B 1/169; B07B 1/54; B07B 2201/04; B08B 7/02; G01N 15/0272; G01N 2015/0288
See application file for complete search history.

(56) References Cited

U.S. PATENT DOCUMENTS 9,943,986 B2 * 4/2018 Hayashi .................... B07B 1/20
2013/0066019 A1 * 3/2013 Okuda .................. C08F 220/06
525/329.7
(Continued)

FOREIGN PATENT DOCUMENTS

| EP | 0 992 293 A1 | 4/2000 |
| EP | 2 548 910 A1 | 1/2013 |

OTHER PUBLICATIONS

International Search Report for PCT Patent Application No. PCT/EP2016/065176, dated Oct. 12, 2016.

*Primary Examiner* — Charles A Fox
*Assistant Examiner* — Kalyanavenkateshware Kumar
(74) *Attorney, Agent, or Firm* — Marshall, Gerstein & Borun LLP

(57) ABSTRACT

A method for the classification of superabsorber particles is disclosed, in which the superabsorber particles are put onto a top screen deck of a screening machine having at least two screen decks with a different hole size, the superabsorber particles which are smaller than the holes of the respective screen deck respectively falling through the holes and the superabsorber particles remaining on the screen deck being removed via an extraction point. Balls are positioned on each perforated plate, which balls are propelled upward by the movement of the perforated plate and strike from below the screen deck respectively lying above, wherein the balls have a stiffness in the range from 40 to 100 N/mm and a
(Continued)

damping in the range from 1 to 4%. A machine for carrying out the method also is disclosed.

8 Claims, 1 Drawing Sheet

(51) Int. Cl.
 *B08B 7/02* (2006.01)
 *B07B 1/46* (2006.01)
(52) U.S. Cl.
 CPC ............ *B08B 7/02* (2013.01); *B07B 2201/04* (2013.01); *G01N 2015/0288* (2013.01)

(56) References Cited

U.S. PATENT DOCUMENTS

2013/0123435 A1* 5/2013 Okuda .................. C08F 220/06
 525/384
2015/0240013 A1* 8/2015 Matsumoto ............... B07B 1/54
 525/55

* cited by examiner

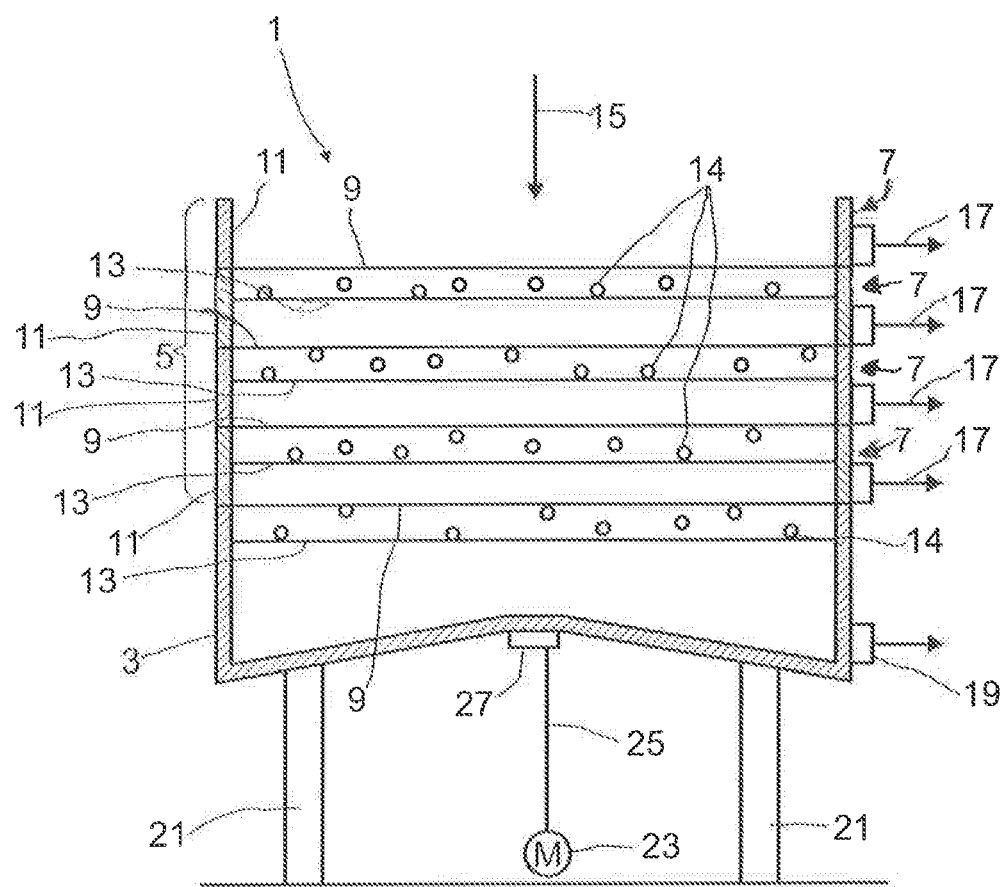

METHOD AND DEVICE FOR CLASSIFYING SUPERABSORBENT PARTICLES

CROSS-REFERENCE TO RELATED APPLICATIONS

This application is the U.S. National Stage application of International Patent Application No. PCT/EP2016/065176, filed Jun. 29, 2016, which claims the benefit of European Patent Application No. 15174750.8, filed Jul. 1, 2015.

The invention is based on a method for the classification of superabsorber particles, in which the superabsorber particles are put onto a top screen deck of a screening machine comprising at least two screen decks with a different hole size, the superabsorber particles which are smaller than the holes of the respective screen deck respectively falling through the holes and the superabsorber particles remaining on the screen deck being removed via an extraction point.

Screening machines are used in order to classify particles in different size classes. To this end, screening machines conventionally comprise a screening structure having a plurality of screen decks with different hole sizes, which are arranged above one another. The hole size of the screen decks positioned above one another decreases from the top downward, so that the superabsorber particles which are smaller than the holes of the screen deck always fall onto the screen deck lying underneath. Below the bottom screen deck there is an exit trough, into which the smallest particles fall. The particles remaining on the individual screen decks and the exit trough are then taken therefrom. In order to assist the screening process, the screening machine is placed on mobile feet which are set in motion with the aid of a drive so that the individual screen decks are set in vibration by the movement of the feet and the particles lying on the screen deck are caused to move.

During the production of superabsorbers, particles are produced in different sizes and subsequently need to be sorted into individual size classes. Screening machines are already currently used for this purpose. A disadvantage, however, is that superabsorber particles may adhere to the individual screen decks. There is also the risk that superabsorber particles whose size corresponds essentially to the size of the openings in a screen deck may jam and remain suspended. Because of this, it is necessary to stop the process regularly and clean the individual screen decks. Such stoppages, however, are undesirable since the efficiency of the classification and therefore the output are thereby reduced.

In conventionally used screening machines, balls are used to clean the screen decks. The balls have a low weight, i.e. a low density, and a high rebound elasticity, in order to ensure cleaning of the screen decks. These balls, however, cannot be used during the classification of superabsorber particles since they exhibit high wear and the abraded material undesirably contaminates the product. Because of the high wear, balls are therefore not currently used for cleaning screen decks during the classification of superabsorber particles.

It is therefore an object of the present invention to provide a method for the classification of superabsorber particles, with which longer operating times are possible and with which the stoppages for necessary cleaning can be minimized.

The object is achieved by a method for the classification of superabsorber particles, in which the superabsorber particles are put onto a top screen deck of a screening machine comprising at least one screen deck, the superabsorber particles which are smaller than the holes of the respective screen deck respectively falling through the holes and the superabsorber particles remaining on the screen deck being removed via an extraction point, wherein balls are positioned below each screen deck, which balls are propelled upward by the movement of the screening machine and strike from below the screen deck respectively lying above wherein the balls have a stiffness in the range from 40 to 100 N/mm and a damping in the range from 1 to 4%.

BRIEF DESCRIPTION OF THE DRAWING

The figure is a schematic of a screening machine having a plurality of screen decks and an exit trough.

In order to permit classification of more than two fractions, it is preferred for the screening machine to comprise at least 2 screen decks with a different hole size. In this case, the hole size decreases from the top downward, so that the superabsorber particles which are larger than the holes in the screen deck remain thereon and the smaller superabsorber particles fall onto the screen deck lying underneath.

By the movement of the balls in such a way that they strike from below the screen deck respectively lying above, absorber material adhering to the screen deck is released and the screen deck is thereby kept free of adhesions. In this case, it is necessary to select the material for the balls in such a way that they are not abraded by the superabsorber particles to be classified and impurities from the material of the balls, which has been abraded by the superabsorber particles, are not thereby introduced. Furthermore, this has the additional disadvantage that the balls become smaller and smaller, and their effect therefore decreases.

In one embodiment of the invention, the balls are always positioned on the screen deck below the screen deck to be cleaned, so that they are propelled up and down between two screen decks. In order to clean the bottom screen deck as well, it is in this case possible to position balls in the exit trough, so that they are propelled up and down between the exit trough and the bottom screen deck.

In order to reduce the mechanical load on the screen decks, in a preferred embodiment perforated plates are respectively introduced below the screen decks, the balls respectively being positioned on the perforated plates so that, during movement of the screening machine, they are propelled up and down between the perforated plate and the screen lying above.

The use of balls to clean the screen decks has not hitherto been used since the superabsorber particles have a rough and sharp surface and therefore have a highly abrasive effect. By introducing a perforated plate, on which the balls rest, below each screen deck, so that they are respectively propelled between a perforated plate and a screen deck, it has surprisingly been found that the balls are not damaged, or are damaged only minimally.

As the screening machine, it is possible to use any desired screening machine known to the person skilled in the art, in which the screen decks are set in motion in such a way that the balls are propelled up and strike from below the screen deck lying above. Such screening machines are, for example, vibration screening machines or tumbler screening machines.

The holes in the individual screen decks may be shaped in any way known to the person skilled in the art. For example, it is possible to introduce individual holes into a plate. It is preferred, however, as is usual for screens, to use a wire mesh, the diameter of the wires being adapted to the fineness of the screen and the holes being formed by the spacing of the individual wires from one another. In this case, the holes usually have a rectangular, in particular square cross section. In this case, the size of the holes refers to the maximum distance between two opposite sides of the hole. In the case of round holes, the size is defined by the diameter.

Classification of the superabsorber particles is necessary since particles of different sizes are produced in conventional methods for the production of superabsorbers.

Superabsorbers are generally polyacrylates or polymethacrylates, also referred to below as poly(meth)acrylates. A conventional method for the production of superabsorbers is the reaction of reactants in a kneading mixer. To this end, the reactants are added to the kneading mixer and, while initially forming a highly viscous compound, reacted to form poly (meth)acrylate. In this case, the kneading mixer conventionally comprises two shafts with kneading bars, which engage in one another. The highly viscous compound is broken up by the inter-engaging kneading bars. At the end of the kneading mixer, the product is removed and placed on a belt dryer on which the superabsorber is dried. After the drying, the particles are optionally broken up. As an alternative, it is also possible to produce the superabsorber in a spray dryer, for example, in which case the reactants are atomized in a spray dryer and, in the drops produced in this way, the reactants are reacted to form the poly(meth)acrylate.

Irrespective of the method for the production of the superabsorber, particles in different sizes are produced. These are classified into different sizes. To this end, a screening machine is used which conventionally comprises a screening structure consisting of an exit trough and at least one screen deck, usually a plurality of screen decks arranged above one another. Conventionally used screening machines in this case comprise between one and six screen decks. The superabsorber particles to be classified are placed from above on the screening structure, that is to say on the top screen deck, and pass through the screening structure, the material fraction remaining on the respective screen deck becoming finer with each screen deck passed through, and the coarser fractions being gradually separated. To this end, the hole size of the screen decks decreases from the top downward according to the desired diameters of the particles of the fractions to be separated. In order to carry out the screening, the screening structure is set in tumbling movements. To this end, for example, the screening structure is mounted on mobile feet or a frame and is driven by a motor. In this case, the screening structure is connected to an eccentric, which is driven via a rotation axle of the motor. The eccentric leads to an offset between the rotation axle and the symmetry axis of the screening structure. In addition, the frame or feet may be configured in such a way that the screening structure can be inclined relative to the rotation axle. By this structure, a tumbling motion is imparted to the screening structure when the rotation axle is driven. The movement is periodic, a period corresponding to the time span of one revolution of the rotation axle. The material to be screened in this case executes an elliptical movement, starting from the middle of the screening structure, at which the material is placed. The residence time of the material in the screening structure may in this case be adjusted by adjusting the eccentric or the inclination angle of the screening structure. In order to remove the material, extraction points are respectively fitted at the edge of each screen deck, through which the respective fraction is removed from the screen deck.

According to the invention, the perforated plates on which the balls are positioned are located between the screen decks. The perforated plates may in this case all have holes with the same diameter, or alternatively, like the screen decks, with a diameter decreasing from the top downward. It is, however, preferred to use perforated plates with the same diameter. The size of the holes is in this case selected in such a way that the screened superabsorber particles fall through easily, but the balls do not. In this case, care should be taken that the balls cannot jam in the holes, so that the holes need to be selected to be correspondingly small enough. It is in this case preferred for the holes in the perforated plates to be smaller than the radius of the balls. On the other hand, it is advantageous for the holes to be at least two times as large as the superabsorber particles respectively falling through the screen deck.

In order to obtain good cleaning of the screen decks, it is preferred for the balls to have a diameter in the range of from 20 to 60 mm.

In order to obtain sufficient cleaning of the screen deck lying above the perforated plate, it is furthermore preferred for the balls to have a rebound elasticity in the range of from 60 to 85%. A rebound elasticity in the range of from 60 to 80% is particularly preferred.

According to the invention the balls have a stiffness in the range of from 40 to 100 N/mm. In particular, it is preferred for the stiffness to lie in the range of from 50 to 75 N/mm.

The damping of the balls lies in the range of from 1 to 4%, particularly in the range of from 1.5 to 4%.

The effect achieved by the corresponding rebound elasticity, rebound energy, stiffness and damping is that the balls are propelled between the perforated plate and the screen deck lying above, and thus strike the screen deck, with a sufficiently high frequency. Furthermore, a sufficient impact energy on the screen deck is thus achieved, which is sufficient to release superabsorber particles adhering to the screen deck and superabsorber particles jammed in the holes of the screen deck, and thus clean the screen deck. In this way, a significantly extended operating time of the screening machine is achieved. In particular, it is not necessary to turn the screening machine off for cleaning purposes after respectively relatively short operating times. Significantly extended service times can be achieved by the automated cleaning with the aid of the balls.

In order to minimize damage to the balls due to abrasion by the superabsorber particles, it has been found that a Shore hardness in the range of from 60 to 120 Shore A is advantageous. A Shore hardness in the range of from 65 to 100 Shore A is particularly preferred.

It has furthermore been found that, for good cleaning of the screen decks, a density of the balls in the range of from 0.8 to 1.3 g/cm$^3$.

The density of the balls may in this case be determined according to DIN EN ISO 1183-1:2004 and the Shore hardness according to DIN EN ISO 868:2003, for example.

The rebound elasticity is determined according to DIN 53512:2000-04 by impinging a sample with a hammer peen with a velocity of 2 m/s and an energy of 0.5 J. The rebound elasticity is the portion of the energy being elastically returned from the sample and is specified in % of the 0.5 J.

In order to determine the damping and the stiffness, static and dynamic pressure tests are used. In the static pressure test, the balls are individually loaded to a compressive force of 100 N and unloaded with a test speed of 5 mm/min. In this case, a force/displacement diagram is recorded, there being a hysteresis loop. The slope of the force/displacement curve gives the stiffness, and the proportion of the area within the hysteresis loop, relative to the area which is contained as a rectangle by the edge lengths of the maximum force and the maximum displacement, gives the damping. A completely elastic ball results in a straight line, and a completely damping ball results in a rectangle which is contained by the maximum force and the maximum displacement as edges.

In order to determine the frequency dependency, as in the static pressure test, the balls are loaded individually between two plates and the force/displacement diagram is evaluated. In this case, however, the loading of the balls takes place with a frequency of 1, 2, 4, 6, 8 and 10 Hz with a deformation between −0.5 and −1.5 mm, the negative deformation meaning that compressive deformation of the balls is involved. The force/displacement diagram is respectively recorded for each frequency, the average stiffness being the slope of the force/displacement curve and the damping being the ratio of the area within the hysteresis loop in relation to the rectangular area defined by the maximum displacement and maximum force.

In particular, elastomers are suitable as material for the balls used for the cleaning. All elastomers known to the person skilled in the art may in this case be used. In order to adjust the properties of the balls, fillers are in this case conventionally added, for example in fiber or powder form. Conventionally used fillers are for example short and long fibers, for example carbon fibers, glass fibers, mineral fibers or aramid fibers. Conventionally used powdered fillers are for example talc. It is particularly preferred to use powdered fillers.

The invention furthermore relates to a screening machine for carrying out the method, the screening machine comprising at least two screen decks, and balls respectively being placed below a screen deck.

In one preferred embodiment, a perforated plate on which the balls are placed is positioned below each screen deck.

In order to clean the bottom screen deck, it is possible on the one hand to introduce balls into the exit trough, so that they are propelled to and fro between the exit trough and the bottom screen deck. As an alternative which is preferred, however, a perforated plate may also be placed below the bottom screen deck and the balls may be positioned between the bottom perforated plate and the bottom screen deck, so that these balls are propelled between the perforated plate and the bottom screen deck and thereby clean the bottom screen deck.

As it is not possible to prevent material being abraded from the balls, usually white or colorless transparent or opaque balls are used, because these do not produce visible impurities in the superabsorbent material.

An exemplary embodiment of the invention is represented in the FIGURE and will be explained in more detail in the description below.

The single FIGURE schematically shows a screening machine having a plurality of screen decks and an exit trough.

A screening machine 1 for the classification of superabsorber particles comprises an exit trough 3 and a screening structure 5 having at least one screen deck 7. In the embodiment represented here, the screening structure 5 comprises four screen decks 7. Depending on the size classes and the minimum and maximum particle diameters of a size class, as well as the particle diameter distribution of the superabsorber particles to be classified, it may however also comprise more or fewer screen decks 7. Conventionally, the screening structure 5 comprises one to six screen decks 7. Each screen deck 7 is equipped with a screen 9 and has a circumferential edge 11 directed upward. Each screen deck 7 is in this case placed concentrically on the upwardly directed circumferential edge 11 of the screen deck 7 lying underneath. In order to prevent material from falling out of the screening machine 1 from a screen deck 7, the diameters of the individual screen decks 7 of the screening structure 5 are preferably equal, as represented here. As an alternative, it is also possible to use screen decks 7 having different diameters, in which case the diameter of the individual screen decks 7 decreases from the bottom upward, so that the higher screen deck 7 respectively has a smaller diameter than the underlying screen deck 7.

Stainless steel is preferably used as the material for the screen 9 and the circumferential edge 11 of each screen deck 7. As an alternative, it is also possible to make the screen 9 from a material by which superabsorber particles are prevented from adhering to the screen 9. To this end, for example, polytetrafluoroethylene or a perfluoroalkoxy polymer is used as the material. It is also possible to make the screen 9 from a ceramic. As an alternative, it is also possible to coat the screen with a material by which superabsorber particles are prevented from adhering to the screen 9. In the case of a coating, it is then necessary to ensure that the diameters of the holes in the screen 9 do not become too small because of the coating.

In addition to making the screen 9 from a material by which superabsorber particles are prevented from adhering to the screen 9, or coating the screen 9 with a corresponding material, it is also possible to provide the circumferential edge 11 of the screen deck 7 with a coating by which superabsorber particles are prevented from adhering.

Below the bottom screen deck 7, there is an exit trough 3. The smallest particles to be separated are collected in the exit trough 3. Since the small superabsorber particles that are collected in the exit trough 3 are liable to adhere to the surface of the exit trough 3, it is possible to provide the exit trough 3 with a coating by which the adhesion of the superabsorber particles to the surface of the exit trough 3 is prevented.

In order to release adhering superabsorber particles from the individual screen decks and to remove superabsorber particles which jam in the holes of the individual screens, according to the invention perforated plates 13 are placed between each pair of screens. Balls 14 are placed on each perforated plate 13, which during operation of the screen are propelled to and fro between the perforated plate 13 and the screen 9 and thus strike the screen 9 from below, and thereby clean the latter. In order to clean the bottom screen 9, it is possible to position in the exit trough balls which are propelled to and fro between the exit trough and the bottom screen. It is, however, preferred also to position a perforated plate on which the balls are placed below the bottom screen 9, so that during operation of the screening machine 1 these are propelled to and fro between the bottom perforated plate 13 and the bottom screen 9.

In order to classify the superabsorber particles into different size classes, they are put onto the top screen deck 7. This is represented by an arrow 15. Preferably, as represented in the FIGURE, the superabsorber particles are placed centrally onto the top screen deck 7. It is, however, also possible to place the superabsorber particles off-center. It is even possible to place the superabsorber particles at the edge of the screen deck 7.

In order to carry out a process of separating the superabsorber particles with the screening machine 1, the screening machine is set in tumbling movements. In this way, the superabsorber particles placed on the top screen deck 7 are also set in motion so that they begin to slide on the screen deck 7. Because of the size of the holes in the screen 9, the superabsorber particles whose diameter is less than the diameter of the holes in the screen 9 fall through the screen 9 onto the underlying screen deck 7. The superabsorber particles whose diameter is greater than the diameter of the holes of the screen 9 remain on the screen deck and are removed from the screen deck 7 via an extraction point 17. This process is repeated for each screen deck 7 of the screening structure 5, the screen decks 7 below the top screen deck 7 respectively receiving the superabsorber particles which fall through the screen 9 of the screen deck 7 lying above. The superabsorber particles which are larger than the holes in the respective screen 9 are removed from the screen deck 7 via the extraction point 17. Classification into different size classes is in this case achieved by the size of the holes in the screens 9 decreasing from the top downward. The smallest superabsorber particles, which fall through the screen 9 of the bottom screen deck 7, are collected in the exit trough 3 and are removed from the exit trough 3 via an extraction point 19. In order to assist the movement of the superabsorber particles in the exit trough 3 in the direction of the extraction point 19, the bottom of the exit trough 3 is preferably—as represented here—conically shaped. In this way, the superabsorber particles additionally slide onto the lowest position. If the extraction point is arranged centrally in the exit trough 3, the tip of the cone is directed downward, while in the case of a laterally arranged extraction point 19, as represented here, the tip of the cone points upward in the direction of the screen deck 7 lying above. The tip may be flattened or pointed. The tip is preferably flattened, so that the cone has the shape of a conic frustrum.

In order to release superabsorber particles trapped in the holes of the screens 9, according to the invention perforated plates 13 are respectively positioned below the screen decks, that is to say between the individual screen decks 7, balls which start to be propelled upward because of the movement of the screening machine 1, and thus impact against the screen 9 respectively lying above and releasing trapped superabsorber particles from the screens 9, being placed on these plates. Correspondingly too, in order to clean the bottom screen deck, either the balls are positioned in the exit trough so that they are propelled against the bottom screen deck, or, as represented here, a further perforated plate is positioned below the bottom screen deck 9, the balls being placed thereon so that during the movement of the screening machine they are propelled to and fro between the bottom perforated plate 13 and the bottom screen 9 and thus also clean the bottom screen 9.

In a preferred embodiment, the screening machine 1 is a tumbler screening machine. In order to be able to impart tumbling movements to the screening machine 1, the exit trough 3 with the screening structure 5 is mounted on a frame or on feet 21. The feet 21 are firmly connected to the floor and have at least one articulation, so that the exit trough 3 and the screening structure 5 mounted on the exit trough 3 can move. Preferably, the feet each have at least two articulations or a flexible section, so that movement in each direction is made possible. In order to generate the movement, it is possible to move the feet 21. It is, however, preferred to provide an additional drive 23. The drive 23 is connected to a rotation axle 25, which ends in an eccentric 27. In the embodiment represented here, the eccentric 27 is mounted centrally below the exit trough 3, so that a rotational movement of the eccentric 27 when the rotation axle 25 is driven causes a typical shaking movement of the exit trough 3 and of the screening structure 5 in the radial direction, without the exit trough 3 and the screening structure 5 itself being set in a rotating movement. In addition, by a tilting movement of the rotation axle 25 or a corresponding movement of the feet 21, it is possible to induce an inclination of the exit trough 3 and of the screening structure 5. This shaking movement and the tilting then lead to a tumbling movement, typical of a tumbler screening machine, of the exit trough 3 and of the screening structure 5. Of course, the screening machine 1 may also be operated without a tilting movement.

EXAMPLES

Balls of elastomer materials with different properties are tested. The properties of the various balls are listed in the following table. In this table V denotes a comparative example and 1 to 7 examples with inventive balls.

TABLE 1

Properties of the balls

| | diameter [mm] | mass [g] | density [g/cm$^2$] | static stiffness [N/mm] | dynamic stiffness at 1 Hz [N/mm] | damping at 1 Hz [%] | hardness Shore A | rebound-elasticity [%] |
|---|---|---|---|---|---|---|---|---|
| V | 34.7 | 32.65 | 1.5 | 35.1 | 30.2 | 4.57 | 60 | 75 |
| 1 | 29.9 | 16.95 | 1.21 | 60.6 | 58.9 | 3.76 | 74 | 64 |
| 2 | 33.9 | 22.08 | 1.08 | 66.5 | 79.9 | 3.83 | 80 | 69 |
| 3 | 35.0 | 23.98 | 1.07 | 67.7 | 77.1 | 1.66 | 78 | 80 |
| 4 | 30.1 | 15.38 | 1.07 | 61.2 | 60.6 | 3.65 | 77 | 72 |
| 5 | 34.0 | 22.28 | 1.08 | 65.1 | 69.7 | 3.55 | 80 | 73 |
| 6 | 29.8 | 14.87 | 1.07 | 60.1 | 59.7 | 2.74 | 77 | 76 |
| 7 | 34.0 | 22.06 | 1.07 | 67.7 | 80.8 | 3.87 | 80 | 72 |

Use of the balls in a screening machine for the classification of superabsorber particles show that the balls of examples 1 to 7 have a longer lifetime until a necessary change than the balls of the comparative example V.

LIST OF REFERENCES 1 screening machine
3 exit trough
5 screening structure
7 screen deck
9 screen
11 circumferential edge
13 perforated plate
14 ball
15 placement of superabsorber particles
17 extraction point of screen deck 7
19 extraction point from the exit trough 3
21 foot 23 drive
25 rotation axle
27 eccentric

The invention claimed is:

1. A method for the classification of superabsorber particles, comprising
putting the superabsorber particles onto a top screen deck of a screening machine comprising at least two screen decks with a different hole size;
classifying the superabsorber particles in that the superabsorber particles which are smaller than the holes of the respective screen deck respectively falling through the holes by propelling upward balls which are positioned below each screen deck by the movement of the screening machine so that the balls strike from below the screen deck respectively lying above;
removing the superabsorber particles remaining on the screen deck via an extraction point,
wherein the balls have a diameter in a range from 20 to 60 mm, a dynamic stiffness at 1 Hz in the range from 40 to 100 N/mm and a damping in a range from 1 to 4%, and
wherein for determining the dynamic stiffness and the damping the balls are loaded individually between two plates with a frequency of 1 Hz with a pressure deformation between −0.5 and 1.5 mm and a force/displacement diagram is recorded, wherein a hysteresis loop results and the stiffness is the slope of the force/displacement curve and the damping is the ratio of the area within the hysteresis loop in relation to the rectangular area defined by the maximum displacement and maximum force.

2. The method according to claim 1, wherein a perforated plate (13) is positioned below each screen deck, and the balls (14) rest on the perforated plate.

3. The method according to claim 1, wherein the balls (14) have a rebound elasticity in the range of from 60 to 85%.

4. The method according to claim 1, wherein the balls (14) have a Shore hardness in the range of from 60 to 120 Shore A.

5. The method according to claim 1, wherein the balls (14) have a density in the range of from 0.8 to 1.3 g/cm3.

6. The method according to claim 1, wherein the balls are made of an elastomer material, the elastomer material optionally containing fillers to adjust the properties.

7. A screening machine comprising at least two screen decks with a different hole size, balls respectively being placed below each screen deck, wherein the balls have a diameter in a range from 20 to 60 mm, a dynamic stiffness at 1 Hz in the range from 40 to 100 N/mm and a damping in a range from 1 to 4%, and wherein for determining the dynamic stiffness and the damping the balls are loaded individually between two plates with a frequency of 1 Hz with a pressure deformation between −0.5 and 1.5 mm and a force/displacement diagram is recorded, wherein a hysteresis loop results and the stiffness is the slope of the force/displacement curve and the damping is the ratio of the area within the hysteresis loop in relation to the rectangular area defined by the maximum displacement and maximum force.

8. The screening machine according to claim 7, wherein a perforated plate (13) is positioned below each screen deck (7), and balls (14) are placed on each perforated plate (13).

* * * * *